United States Patent [19]
Gnehm

[11] Patent Number: 5,095,513
[45] Date of Patent: Mar. 10, 1992

[54] LOW VOLTAGE OPTICAL LIGHT MODULATOR

[75] Inventor: Christopher M. Gnehm, Kirkland, Wash.

[73] Assignee: BodyScan Medical Corporation, Kent, Wash.

[21] Appl. No.: 619,726

[22] Filed: Nov. 29, 1990

[51] Int. Cl.$^5$ .............................................. G02B 6/10
[52] U.S. Cl. .......................................... 385/3; 385/2
[58] Field of Search ............... 350/96.12, 96.13, 96.14, 350/96.15, 96.17, 96.18, 96.34; 307/424, 425, 430

[56] References Cited

U.S. PATENT DOCUMENTS

| | | | |
|---|---|---|---|
| 4,536,450 | 8/1985 | Garito | 350/96.34 X |
| 4,877,298 | 10/1989 | Teng et al. | 350/96.14 |
| 4,886,332 | 12/1989 | Wolfe | 350/96.12 |
| 4,887,884 | 12/1989 | Hayden | 350/96.29 |
| 4,898,441 | 2/1990 | Shimizu | 350/96.14 |
| 4,953,936 | 9/1990 | Regener et al. | 350/96.17 |
| 4,976,506 | 12/1990 | Paulath | 350/96.17 |

*Primary Examiner*—William L. Sikes
*Assistant Examiner*—Phan T. Heartney
*Attorney, Agent, or Firm*—Delbert J. Barnard

[57] ABSTRACT

A light source fiber optic cable (56) is connected at a first end (66) to a light source diode (64) and at a second end (82) to a first end (14) of a polarized polyvinylidene fluoride film member (10). A second fiber optic cable (60) is connected at a first end (88) to the second end (16) of the film member (10) and at a second end to a light analyzer (52). An adjustable electrical input (50) to the film member (10) changes the path of light travel through the film member (10) from its first end (12) to its second end (14).

25 Claims, 4 Drawing Sheets

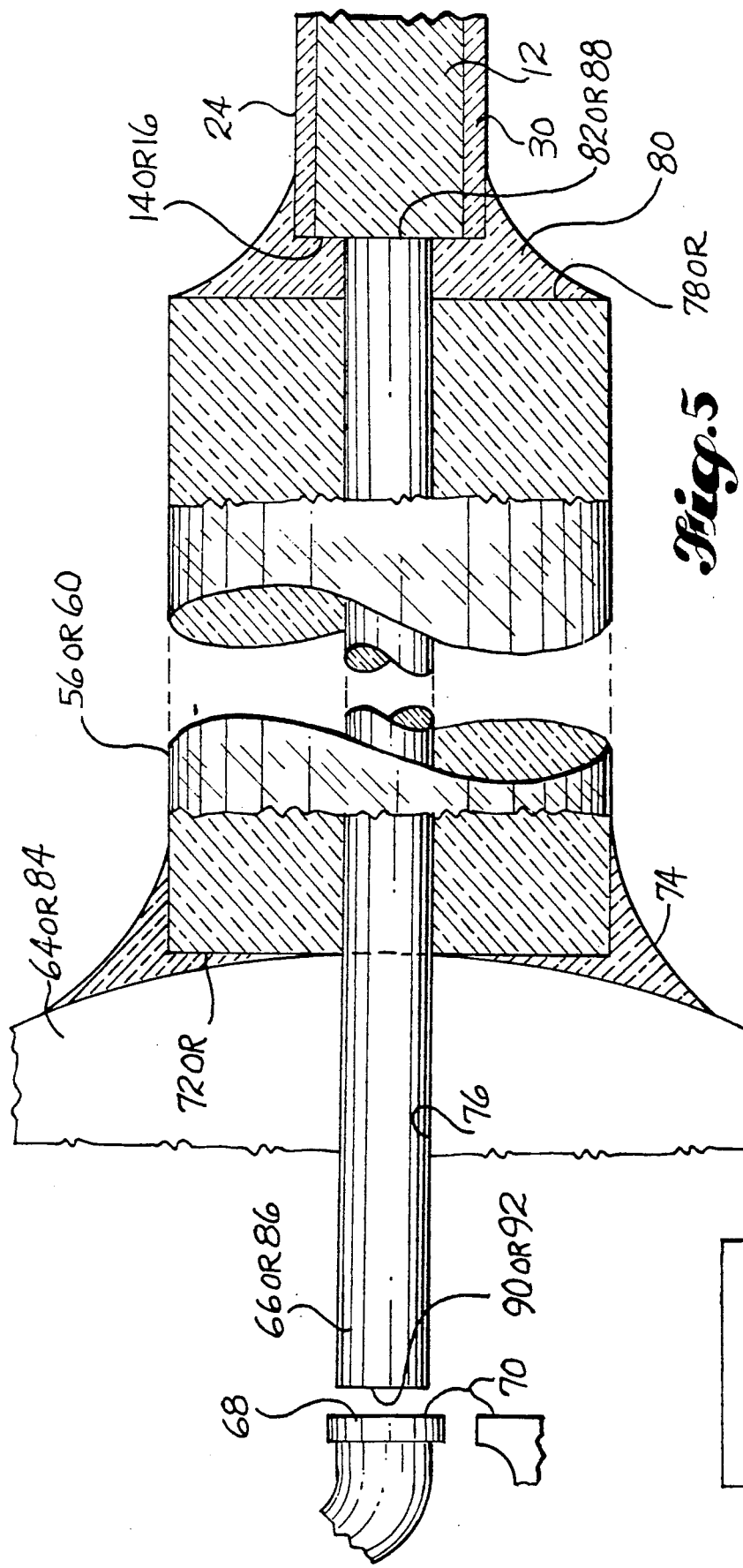

LOW VOLTAGE OPTICAL LIGHT MODULATOR

TECHNICAL FIELD

The invention relates to optical modulators and, more particularly, to the provision of a modulator which is adapted for speed operation by application of extremely small voltages, and is composed of small, relatively inexpensive components.

BACKGROUND INFORMATION

Inorganic crystal type electrooptical modulators are well known. Generally speaking, they operate in the following manner. Linearly polarized light is passed through a crystal medium exhibiting an electrooptical effect and the output beam is passed through another polarizer. A modulating electrical field is applied to control the eccentricity and orientation of elliptical polarization and hence the magnitude of the component of light in the direction of the output polarizer. Typically, the input linear polarization is oriented to have equal components along fast and slow axes of the crystal medium and the output polarizer is orthogonal to the input polarizer. The modulating field causes a phase differential varying from zero to $\pi$ rad. This causes the polarization to change from linear (at zero) to circular (at $\pi/2$) to linear normal to the input polarization (at $\pi$). Thus the intensity passing through the output polarizer varies from zero to 100% as the phase differential varies from zero to $\pi$ rad. See for example the "Electronics Engineers Handbook", Second Edition, by Donald G. Fink and Donald Christianson, published in 1982 by McGraw-Hill Book Company (Library of Congress Catalog No. TK7825.E34).

The medium that is typically used in optical modulators is an inorganic crystal material which is bulky, expensive and requires high voltage electrical fields to perform the modulating or switching function.

A principal object of the present invention is to provide an improved optical modulator which utilizes a polymer film medium which is small in size, is relatively inexpensive, and permits high speed modulation by use of very small applied immediate potential for information control in optical circuitry, laser modulation and deflection, and the like.

DISCLOSURE OF THE INVENTION

An optical light modulator constructed according to the invention is basically characterized by the use of a polarized polymer film member for the light modulating medium. Polarized light is directed through this medium, from a first end of the film member to a second end. The film material includes molecular dipoles or polarons which are elongated molecular chains extending in the direction of the material thickness. Slight changes made in a low voltage electrical energy field applied to the film member rotates the polarons in position and modulates light travel rapidly through the film member.

In preferred form, three laterally spaced apart electrodes are formed on each side of the film member. Each electrode extends from the first end to the second end of the film member, parallel to the other electrodes. Each electrode is paired across the film member with an electrode opposite it on the opposite side of the film member. Thus, there are two outside pairs of electrodes and one inside pair of electrodes. A direct current bias voltage is applied between the two outside pairs of electrodes. An adjustable voltage is applied across the inside pair of electrodes, to vary the electrical field. Changes in the electrical field causes rotation of the polarons which in turn modulates light travel through the film member.

In preferred form, a first polarized fiber optic cable is connected to the first end of the film member and serves to deliver polarized light to the film member. A second polarized fiber optic cable is connected to the second end of the film member and is adapted to transmit from the film member the light received by it which can vary between about 100% to 0% of the light delivered to the film member.

A light emitting diode or a laser diode may be used as a light source, to produce visible or invisible infrared light. According to an aspect of the invention, a socket is formed axially into the diode and the core of the optical cable is inserted into the socket with its end closely adjacent the active member of the diode. A similar connection may be made between the second end of the second fiber optic cable and a light detection diode.

According to an aspect of the invention, a film member is used which is about two polarons (about nine microns) in thickness. A biasing voltage is applied to the film member. Polarization maintaining fiber optic cables are connected to the film member mid way between the center electrodes in alignment with each other to the opposite ends of the film member. The cables are rotationally affixed to the film member in positions resulting in delivered polarized light traveling endwise through the film and, when the bias is undisturbed, being received at maximum intensity at the opposite end of the film. A control voltage is applied to change the electric field and in turn cause the polarons to rotate in position. This in turn changes the intensity of the light received by the second fiber optic cable as a function of the control voltage.

Herein the term "optical modulator" is used to include optical switches, it being recognized that a switch stops light travel by modulating light intensity down to zero.

These and other objects, features and advantages of the invention are hereinafter described as a part of the description of the best mode.

BRIEF DESCRIPTION OF THE DRAWINGS

Like reference numerals are used to designate like parts throughout the several views of the drawing, and:

FIG. 5 is a view of the end portions of a fiber optic cable, showing one end connected to the lens of a light emitting diode and the opposite end connected to one end of the modulator, with the intermediate portion of the cable being cut away to indicate indeterminate length; and FIG. 6 is a diagram showing a light source diode connected to a powering circuit and showing the light source fiber optic cable connected to the lens of the light source diode.

BEST MODE FOR CARRYING OUT THE INVENTION

Figure 1:
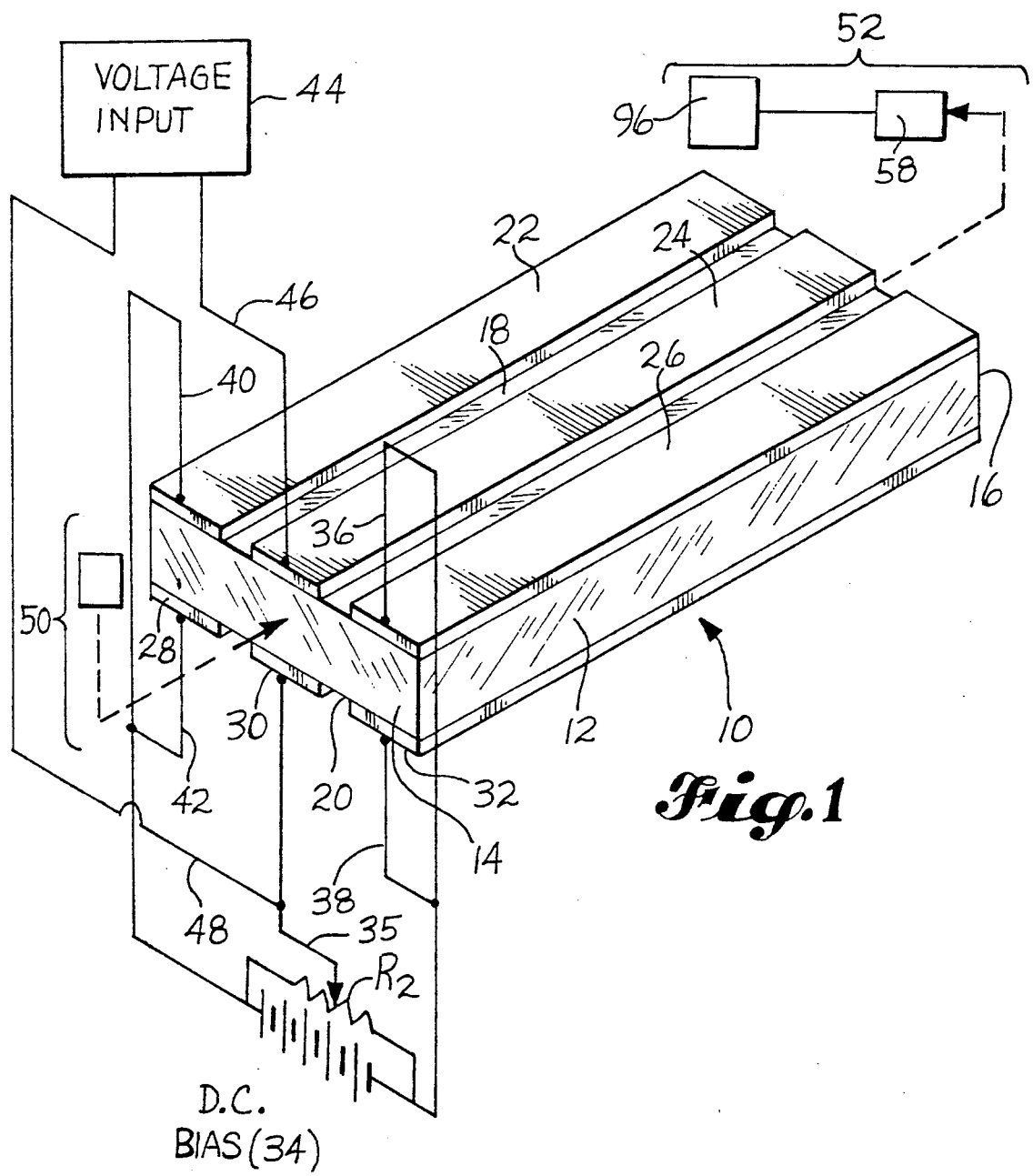
FIG. 1 is a schematic diagram of a system including a light modulator constructed according to the invention, such view including a pictorial view of the modulator.
Figure 2:
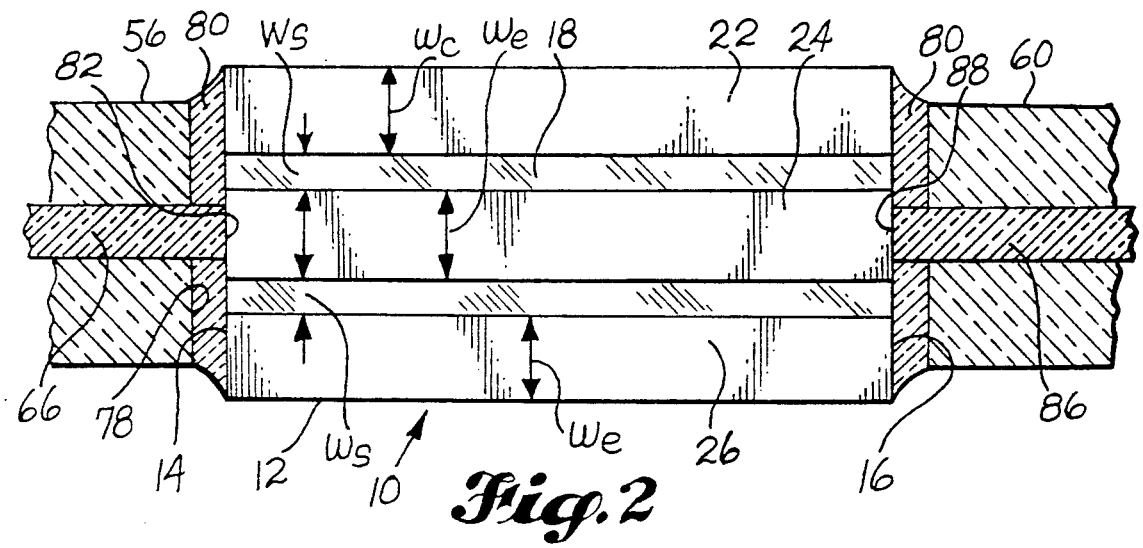
FIG. 2 is a plan view of the modulator, showing end portions of a light source fiber optic cable and an end portion of a modulated light fiber optic cable, coupled to the opposite ends of the modulator.
Figure 3:
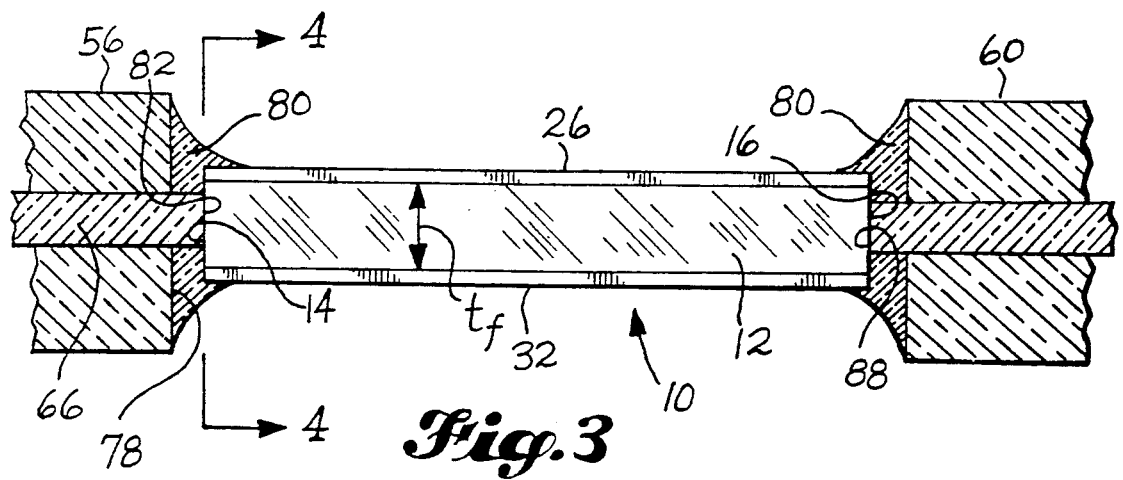
FIG. 3 is a side elevational view of the assembly shown by FIG. 2.

Referring to FIGS. 1-4, the modulator 10 comprises a rectangular film member 12 which is constructed from a polarized polymer film material, hereinafter described in detail. Film member 12 includes a first end 14, a second end 16, a first side 18 and a second side 20. In the preferred embodiment, three electrodes 22, 24, 26 are positioned on side 18 and three like electrodes 28, 30, 32 are positioned on side 20. Each electrode 22, 24, 26, 28, 30, 32 extends lengthwise of the film member 12, from the first end 14 to the second end 16, parallel to the other electrodes 22, 24, 26, 28, 30, 32. Each electrode 22, 24, 26, 28, 30, 32 is paired across the film member with an electrode opposite it on the opposite side of the film member. As shown, electrode 22 is paired with electrode 28. Electrode 24 is paired with electrode 30. Electrode 26 is paired with electrode 32. Thus, there are two outside pairs of electrodes, viz. pair 22, 28 and pair 26, 32, and one inside pair of electrodes, viz. pair 24, 30.

As illustrated in FIGS. and 2, a D.C. bias 34 is connected between the outside electrode pairs. As illustrated, electrical conductors 36, 38 extend from outside electrodes 26, 32, respectively, to a first end of the D.C. bias 34. Electrical conductors 40, 42 extend from electrodes 22, 28, respectively, to the second end of the D.C. bias 34. A variable resistor $R_v$ is connected across the D.C. bias 34 with its contact arm 35 connected to conductor 48. The inside pair of electrodes 24, 30 are connected to an adjustable electrical energy input 44, e.g. a sine wave generator. As illustrated, electrical conductor 46 extends from input 44 to electrode 24. Electrical conductor 48 extends from input 44 to electrode 30.

According to the invention, and as schematically shown in FIG. 1, a light source 50 is connected to the first end 14 of film member 12 and a light analyzer 52 is connected to the second end 16 of film member 12. The connection at each end is made at a location between the electrodes 24, 30. In preferred form, light source 50 includes a light source diode 54 (FIG. 6), e.g. a LED or a laser diode, and a circular polarization maintaining fiber optic cable 56. The light analyzer 52 comprises a photodiode or photo transistor 58 and a circular polarization maintaining fiber optic cable 60. The output of the photodiode or photo transistor 58 is connected to an electrical signal generating device 62. Device 62 produces an electrical signal that is used as a control signal or an information input into a computer, for example.

By way of typical example, the film member 12 may be cut from a sheet of polarized polyvinylidene fluoride (PVDF). Physically, this material is a flexible, compliant or yielding, clear plastic film which can be readily cut. The material when "poled" has significant piezo electric and pyroelectric characteristics. These two macroscopic characteristics provide it with significant electro-optic characteristics, as will be described. The material, as with most polymers, contains molecular chains which move in an anisotropic direction when energized by an electric field. The material can be permanently "poled" by heating the material up to its "curie" temperature, i.e. the temperature in which it makes a marked change in magnetic properties and becomes paramagnetic, then applying a large D.C. potential across the film, and then allowing the film to cool with this potential. The poling process provides a permanent orientation of molecular dipoles within the polymer. The molecular dipoles, also termed polarons, are stretched to a length of about four to five microns extending in the direction of the film thickness. Creation of an electric field in a second direction will cause the polarons to each rotate in position from a center of rotation which is located relatively close to one end of the polaron. This rotation of the polarons changes the way light travels through the material. Specifically, the rotation of the polarons causes significant changes in the wavelength of the light that is transmitted endwise through the material. As will be explained, the introduction of a directional electric field, and the rotational response by the molecular dipoles or polarons of the polymer, is used to modulate or control light transmission through the material. As will be shown, this modulation can be obtained by use of very low voltages.

The "poling" is performed during manufacture of the polymer film. In a manner that is known per se, the film is coated on both sides with a conductive metal, e.g. vacuum deposited nickel oxide. These conductive metal layers are first used in the poling process. A positive voltage is connected to the metal on one side of the film and the metal on the opposite side of the film is connected to a negative voltage. In accordance with an aspect of the invention, the metal layers are later reconfigured to provide electrodes used to apply a directional electric field to cause modulation.

The modulator must be prepared with great care and exacting precision. The PVDF film must be cut in a manner resulting in a flat edge at each end 14, 16 having a minimal amount of scratches. By way of nonlimiting example, this cutting can be done by the use of a pair of stainless steel scissors or a razor blade. Either method can be used to cut both the film and the metal layers on the film. If scissors are used, the blades must be honed flat and should be immersed in mineral oil. If a razor blade is used, the blade should be coated with mineral oil and supported between two guide surfaces which are perpendicular to the file while being moved along the material to make the cut. It was found that either one of these methods could provide a well controlled edge cut. A precision straight cut is critical because the ends 14, 6 are where light loss potential is the greatest.

The embodiment of the modulator 10 illustrated in FIGS. 1-4 will now be described in some detail. A film member 12 was cut which measured 1.1 cm. in width by 2.0 cm. in length. The particular film used had a thickness of about 8 to 9 microns. The film was acquired from the Pennwalt Corporation which has regional sales offices in Valley Forge, Pa., in Arlington Heights, Ill., and in Littleton, Colo. The Pennwalt PVDF film is marketed under the name (KYNAR), primarily for use in flexure switches. A characteristic of the film is that it has a direction of elongation in which it will change its dimension in response to an applied electrical voltage. This direction is indicated on the KYNAR film by arrows on the metal layers. The direction of elongation is perpendicular to the direction of light travel through the film. Care must be taken to assure that the film is properly cut so that the arrows extend perpendicular to the length dimension of the film member 12.

Once the film is cut to provide a film member 12, and the edges are inspected for good quality edge surfaces, such as by use of a 300X microscope, the electrodes 22, 24, 26, 28, 30, 32 are prepared. A jig may be used to hold the film member 12 while the electrodes are formed. The jig may include a piece of wood having a quality, flat, smooth texture upper surface. Electrical tape may be used to outline on the wood surface the 1.1 cm. by 2.0 cm. outline of the film member 12. Next, the outer surfaces of the nickel electrode layers on the two sides of the film member 12 are covered with an acid resistant paint or coating. Four thumbtacks are placed in the wood, with X and Y separations of 0.3 cm. and 3.0 cm., respectively. A thread holder is secured which has a pair of spaced apart parallel arms which extended perpendicular to a connecting portion. A thin nylon sewing thread is secured to an end portion of one arm and then stretched tightly and then secured to an end portion of the second arm. Next, this tensioned thread is immersed into a body of 5% HCL solution and allowed to soak for about five minutes. The film member 12 is placed in the jig and positioned to place the X and Y separations where an electrode is to be formed. The acid solution soaked thread is then positioned against the thumbtacks, and lightly pressed on the coated nickel surface. The thread is then carefully pushed and pulled while guided by the thumbtacks, to slowly remove both the acid resistant coating and the nickel layer below it. This process is repeated at each location between each pair of electrodes 22, 24, 26, 28, 30, 38. The acid etching is used to completely remove the nickel layer down to the film surfaces 18, 20, so that a distinct gap W, devoid of conductive metal material is formed between each pair of adjacent electrodes 22, 24, 26, 28, 30, 32. The electrodes 22, 24, 26, 28, 30, 32 each measured about 0.3 cm. in width ($W_e$) to about 2.0 cm. in length. The electrodes were evenly separated from each other by a space ($W_s$) of about 1.0 mm. Following formation of the electrodes 22, 24, 26, 28, 30, 32, the remaining acid resistant coating is removed by a dilute alcohol solution.

In the preferred embodiment, the light source diode 54 includes an output lens 64. According to an aspect of the invention, the cable core 66 is embedded into the lens 64. A size "00" syringe tip may be used as a drill bit. This tip is proper in size and it included a diagonal bevel at its end. The syringe tip is placed in a drill and is positioned to drill along the longitudinal axis of the diode 54. A socket is drilled which extend through the diode 54 down to a position closely adjacent the active element 68. A bridge wire 70 is connected to the active element 68. The drilling is preferably performed down to a stopping point approximately at the level of the bridge element 70. The syringe tip is preferred because it creates a flat smooth bottom surface in the socket and a smooth side wall. A mixture of cerium oxide and water may be introduced into the socket 76 and used to polish the side and bottom walls of the socket 76. Thereafter, the socket is flushed clean and allowed to dry. The fiber optic cable 56 is cleaved and inspected for high quality cut at the end of the cable core 66. The material surrounding the core 66 is removed up to an end surface 70 which was positioned contiguous the outer surface of the lens 64 when the core 66 was in place within the socket 76. A fiber optic coupling compound ?2 is applied to the end portion of the cable. The cable core 66 is then inserted endwise into the socket 76 and the assembled parts are supported until the coupling compound 74 hardened. The coupling compound 74 should have an index of refraction between 1.55 to 1.60.

Figure 4:
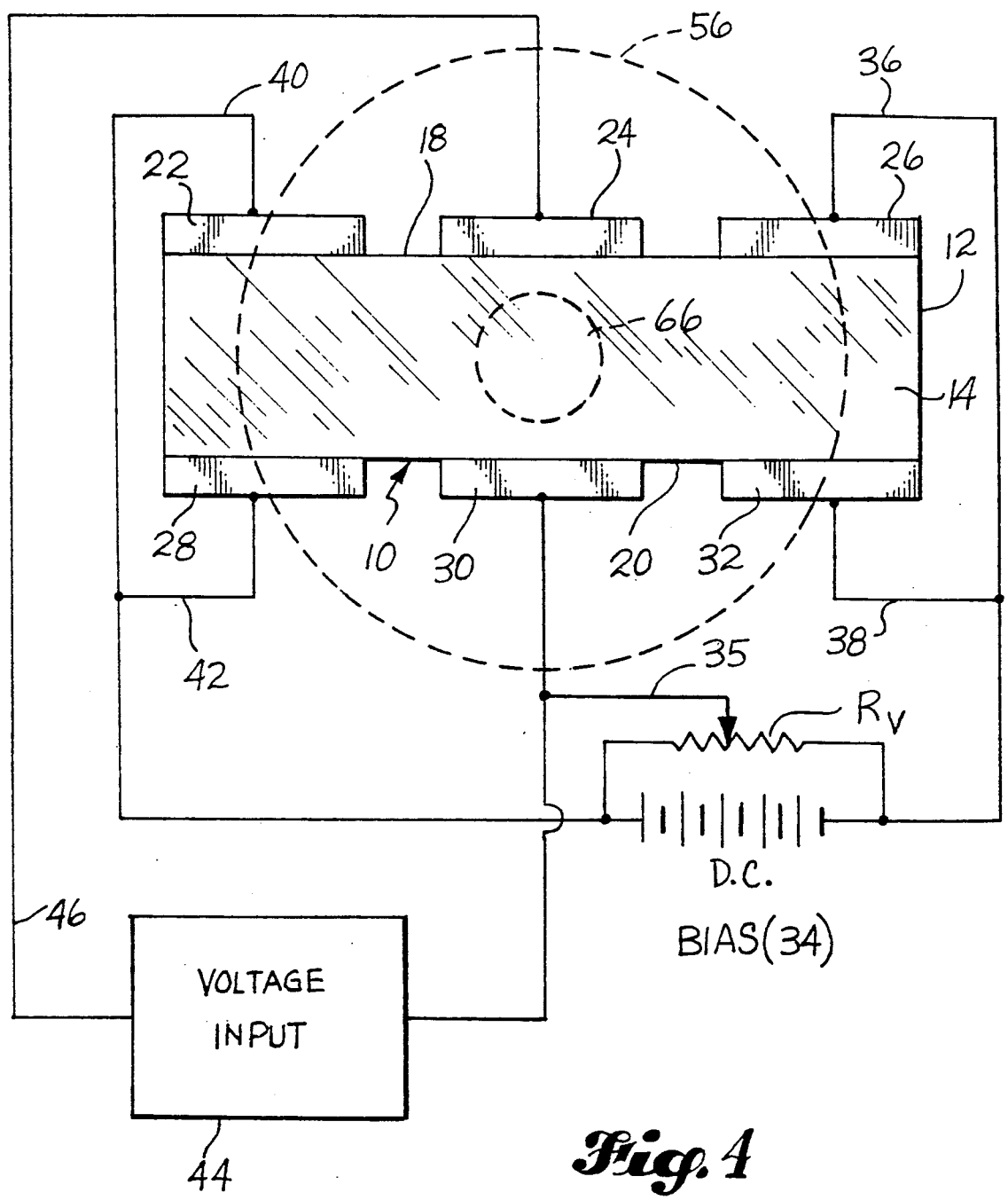
FIG. 4 is a sectional view taken substantially along line 4—4 of FIG. 3, including a solid line showing of the light source cable core and a broken line showing of the cable envelope, and further including a schematic diagram of a D.C. biasing circuit and a modulating circuit.

The opposite end of the light source cable 56 is attached to the first end 14 of the film member 12. The cable end is carefully cleaved to provide a high quality end surface and the surrounding portion of the cable 56 is out back to form an end surface 78. The exposed end of the cable 56 must be kept very clean prior to its assembly to the film body 12. It was found that even a very small piece of dust could scratch the cable core and adversely affect light transmission. The second end of cable 56 is connected to the first end 14 of film member 12, by the use of a coupling compound 80. The butt end 82 of the cable core 66 is placed tight against the end surface 14. It is also essential that the rotational position of the cable core 66 be proper with respect to the polarons in the film material. Proper rotational orientation can be established in the following manner. Firstly, light emission from the diode 54 and light travel through the fiber optic cable 56 are checked. If visible light is used, the light should be clearly visible at the end 82 of the core 66. If the light is not visible (e.g. of an infrared wavelength), then an instrument (e.g. infrared detector) must be used to detect if light is traveling through the core 66. The film member 12 is supported between two pieces of conductive carbon foam when the light source cable 56 is attached to the film member 12. One piece of the conductive carbon foam serves to short out the electrodes 22, 24, 26 on the first side 18 of the film member 12. The second piece of carbon foam does the same thing for the electrodes 28, 30, 32 on the second side 20 of the film member 12. This shorting serves to essentially completely remove any electric field from the film member 12 before the fiber optic cables are attached to it. The carbon foam members also serve to block light travel into the film material from the two sides 18, 20 of the film member 12 when the fiber optic cables are being attached. This allows visible light to be viewed as it leaves the second end 16 of the film member 12. The cable end surface 82 is placed against film member end surface 14, at a location generally centered between electrodes 24, 30 (FIG. 4). Light source cable 56 is then slowly rotated until the maximum light output is obtained at the opposite end 16 of the film member 12. Then, the light source cable 56 is secured to the film member 12 by use of an optically transparent coupling compound 80. In the preferred embodiment, the light source cable core 66 had a refraction index of 1.57. The refraction index of the film member was 1.33. The coupling compound used had a refraction index of 1.4, i.e. an index between the core index and the film member index.

As previously mentioned, the light analyzer 52 may include a photodiode 58 and it may include an input lens and be similar in construction to the light source diode 54. The lens 84 may be formed to include a socket 76 for receiving an end portion of the cable core 86 within cable 60. The cable 60 is cleaved and stripped, at its first end, to expose an end portion of the core 86 and form a good quality end surface 88. This end surface is joined to the second end 16 of film member 12 in the same manner that end 82 of core 66 is joined to the first end 14, i.e. by use of a coupling compound 80. The second end portion 86 of the cable 60 is inserted into a drilled socket 76 in input lens 84, and is secured in place by use of a coupling compound 74, in the manner described above with respect to the connection of cable core 66 to lens 64. FIG. 5 serves to illustrate both cables 56, 60 and the connections of their ends to the diodes 54, 58 and to the ends 14, 16 of the film member 12.

It is also necessary to properly rotate and orient the cable core 86 before attaching it to end surface 16 of film member 12. The cable must be rotated until it is in a position in which it receives a maximum of the light output from the film member 12. The best way of determining the correct position is to pulse the light source diode 54 at a frequency higher than 60 Hz, e.g. 100 Hz. The output of the diode 58 is attached to a scope (not shown). The cable 60 is rotated until the wave form developed on the screen of the scope reaches peak amplitudes. When this happens the cable 60 is in a correct rotational position relative to end surface 16 and it can be secured to the end surface 16, by use of the coupling compound 80.

As one would expect, light emitting from the active element 68 in the diode 54 tends to diverge somewhat as it extends outwardly through the lens 64. The placement of the first end 90 of light source cable core 60 closely adjacent the active element 68 results in a delivery of the generated light into the cable core 16 before it has a chance to diverge to any significant extent. The placement of the end surface 92 of cable core 86 closely adjacent the active element 68 in the diode 58 results in a substantially direct introduction of the light stream against the active element 68, thus minimizing light loss.

The fiber optic cables 56, 80 should each be of a length greater than one foot but each can be substantially longer without any sacrifice in performance.

Referring to FIG. 6, the light source diode 54 is shown to be connected to a control circuit 94. By way of example, the control circuit 94 may be adapted and operated to provide a continuous amperage to the diode 54, in which event the diode 54 will generate a continuously on beam of light. Or, the control circuit 94 may be adapted and controlled to deliver current to the diode 54 at a pulse frequency of about 60-100 cycles per second, regulated so that the diode 54 is on only a percentage of the time and off the remainder of the time. This manner of operation results in it being possible to obtain a high intensity light from a relatively small diode 54 without a rapid burnout of the diode 54. Diode 58 is connected to a receiving circuit 96. Diode 58 converts light energy to electrical energy. The circuit 96 preferably includes an amplifier for the electrical signal generated by the diode 58, and some sort of utilization device for the signal, e.g. a control element operating in response to the signal, a computer which receives the signal as a source of information, etc.

PVDF film is available in thicknesses, expressed in microns, of 9, 16, 28, 52, 110, 220 and 800. In preferred form, the 9 micron thick film is used. This provides a film that can rapidly transmit short wavelength light and which can be modulated at high speed by the application of a very small voltage to the film member 12. In installations requiring transmission of longer wavelength light, the 16 micron thick film will provide good results.

By way of example, the fiber optic cables 56, 60 can be a polarization preserving fiber such as manufactured by YORK V.S.O.P., having a place of business at 210 N. Glenoaks Blvd., Suite C, Burbank, Calif. 91502.

In the drawings, it was not possible to both adequately illustrate the components and the connections and at the same time use an accurate scale. This is because the film member used for the film member 12 has, in preferred form, a thickness of only about 9 microns. The diameter of the cable cores 66, 86 is only about 6 microns. As stated above, in the preferred embodiment, the film member measures only about 1.1 cm. in width to about 2.0 cm. in length. In actuality, the electrode material on the two sides 18, 20 of the film member 12 is thicker than the film material. However, in the drawings the electrodes 22, 24, 26 are shown thinner. This is because the thickness of the film member 12 and the diameters of the cable cores 66, 86 have been greatly exaggerated, to better show the connections which must ;be made. It was felt that to show the electrodes 22, 24, 26, 28, 30, 32 in a thickness that is actually proportional to the film thickness would distract from the disclosure of the important relationships.

As will be apparent, the control circuit converts an input stimulus to a voltage change which is inputted to the film member 10. The input stimulus may be a dimensional change in a structure, a light level change, a sound level change, a chemical change, etc. The invention has utility in any installation or environment in which it is desirable to use fiber optic technology in place of electrical circuitry.

If a gas laser light source is used, the modulator can be driven by very small voltages, viz. ten to fifteen millivolts. If a light emitting diode is used, the operating voltage is about one to four volts.

From the foregoing, various modifications, component arrangements, and modes of utilization of the invention will be apparent to those skilled in the art to which the invention is addressed. The scope of protection is not to be limited by the details of the embodiment which has been illustrated and described. Rather, the scope of protection is to be determined by the appended claims, interpreted in accordance with the established rules of patent claim interpretation, including use of the doctrine of equivalents.

What is claimed is:

1. An optical light modulator, comprising:
    a film member having first and second ends and first and second sides, said film member being constructed from polarized polyvinylidene fluoride having molecular dipoles elongated in the direction of film thickness;
    a light source connected to the first end of the film member;
    a light analyzer connected tot he second end of the film member;
    said film member transmitting polarized light through the film, from the light source connection at the first end of said film member to the light analyzer connection at the second end of the film member;
    an adjustable electrical energy input connected to the film member; and
    said molecular dipoles rotating in response to adjustments in the electrical energy input, and said rotation of said molecular dipoles modulating transmission of light through the film member, from the light source connection to the light analyzer connection.

2. The modulator of claim 1, comprising three laterally spaced apart electrodes on each side of the film member, each said electrode extending from the first end to the second end of the film member, parallel to the other electrodes, and each said electrode being paired across the film member with an electrode opposite it on the opposite side of the film member, whereby there are two outside pairs of electrodes and one inside pair of electrodes, said adjustable electrical energy input comprising said electrodes and means establishing a direct current bias voltage between the two electrodes of each outside pair of said electrodes.

3. The modulator of claim 2, further comprising a sine wave generator having conductors connected to the electrodes of the inside pair of electrodes.

4. The modulator of claim 2, wherein said light source includes a length of fiber optic cable having a light-transmitting core connected at a first nd to the first end of the film member.

5. The modulator of claim 4, wherein the light source also includes a diode having an output lens and the second end of the light-transmitting core of the length of fiber optic cable is connected to said output lens.

6. The modulator of claim 5, wherein said output lens includes an axial socket and the first end of the first cable core is within said socket and said first cable is secured to said output lens by a coupling compound.

7. The modulator of claim 5, further comprising a sine wave generator connected to the light source diode for driving the light source diode to provide pulses of light.

8. The modulator of claim 5, wherein the diode is a laser diode.

9. The modulator of claim 5, wherein the diode is a light emitting diode.

10. The modulator of claim 3, wherein the light analyzer includes a photodiode having an input lens, and a second length of fiber optic cable having a light-transmitting core including a first end connected to the second end of the film member and a second end joined to the input lens of the photodiode.

11. The modulator of claim 10, wherein said input lens includes an axial socket and the second end of the second cable core is within said socket and said second cable is secured to said output lens by a coupling compound.

12. An optical modulator, comprising: a film member having first and second ends and first and second sides, said film member being constructed from a polarized polymer which includes molecular dipoles elongated in the direction of film thickness;
   a light source connected to the first end of the film member;
   a light analyzer connected to the second end of the film member;
   said film member transmitting polarized light through the film, from the light source connection at the first end of said film member to the light analyzer connection at the second end of the film member;
   an adjustable electrical energy input film member, comprising three laterally spaced apart electrodes on each side of the film member, each said electrode extending from the first end to the second end of the film member, parallel to the other electrodes, and each said electrode being paired across the film member with an electrode opposite it on the opposite side of the film member, whereby there are two outside pairs of electrodes and one inside pair of electrodes, said adjustable electrical energy input further comprising means establishing a direct current bias voltage between the two electrodes of each outside pair of said electrodes; and
   said molecular dipoles rotating in position in response to adjustments in the electrical energy input, and said rotation of the molecular dipoles modulating light transmission through the film member from the light source.

13. The modulator of claim 12, wherein the light analyzer includes a photodiode having an input lens, and a length of fiber optic cable having a light-transmitting core including a first end connected to the second end of the film member and a second end joined to the input lens of the photodiode.

14. The modulator of claim 13, wherein said input lens includes an axial socket and the second end of the cable core is within said socket and said cable is secured to said output lens by a coupling compound.

15. The modulator of claim 12, further comprising a sine wave generator having conductors connected to the inside pair of electrodes.

16. The modulator of claim 12, wherein said light source includes a length of fiber optic cable having a light-transmitting core connected at a first end to the first end of the film member.

17. The modulator of claim 16, wherein the light source also includes a diode having an output lens and the second end of the light-transmitting core of the length of fiber optic cable is connected to said output lens.

18. The modulator of claim 17, wherein said output lens includes an axial socket and the first end of the first cable core is within said socket and said first cable is secured to the output lens by a coupling compound.

19. The modulator of claim 16, wherein the diode is a laser diode.

20. The modulator of claim 16, wherein the diode is a light emitting diode.

21. An optical light modulator, comprising:
   a film member having first and second ends and first and second sides, said film member being constructed from a polarized polymer which includes molecular dipoles elongated in the direction of film thickness;
   a light source connected to the first end of the film member, said light source including a length of fiber optic cable having a light transmitting core connected at a first end to the first end of the film member;
   a light analyzer connected to the second end of the film member, said light analyzer including a photodiode having an input lens, and a second length of fiber optic cable having a light transmitting core, a first end connected to the second end of the film member, and a second end joined to the input lens of the photodiode;
   said film member transmitting polarized light through the film, from the light source connected at the first end of said film member to the light analyzer connection at the second end of the film member;
   an adjustable electrical energy input connected to the film member; and
   said molecular dipoles rotating in response to adjustments in the electrical energy input, and said rotation of said molecular dipoles modulating transmission of light through the film member, from the light source connection to the light analyzer connection.

22. The modulator of claim 21, wherein the light source also includes a diode having an output lens and the second end of the light-transmitting core of the length of fiber optic cable is connected to the output lens.

23. The modulator of claim 22, wherein the output lens includes an axial socket and the first end of the first cable core is within said socket and said first cable is secured to the output lens by a coupling compound.

24. The modulator of claim 23, wherein the input lens of the photodiode includes an axial socket and a second end of the cable core is within said socket and said cable is secured to said output lens by coupling compound.

25. The modulator of claim 21, wherein the input fiber optic cable and the output fiber optic cable are each polarization preserving cables which are rotated before attachment to provide high intensity light transmission into the film member and out from the film member when the molecular dipoles are oriented to transmit light into the output fiber optic cable.

* * * * *

UNITED STATES PATENT AND TRADEMARK OFFICE
CERTIFICATE OF CORRECTION

PATENT NO. : 5,095,513
DATED : March 10, 1992
INVENTOR(S) : Christopher M. Gnehm It is certified that error appears in the above-identified patent and that said Letters Patent is hereby corrected as shown below:

Column 1, line 7, insert -- high -- before "speed".
Column 3, line 28, "Figs. and" should be -- Figs. 1 and --.
Column 4, line 50, "14, 6" should be -- 14, 16 --.
Column 5, line 33, "W," should be -- $W_s$ --.
Column 5, line 66, "?2" should be -- 72 --.
Column 6, line 7, "out back" should be -- cut back --.
Column 6, line 25, "core 66:" should be -- core 66. --.
Column 8, line 11, "must ;be" should be -- must be --.
Claim 1, column 8, line 46 "tot he" should be -- to the --.
Claim 4, column 9, line 9, "nd" should be -- end --.
Claim 12, column 9, line 38, after "optical", insert -- light --.

Signed and Sealed this

Sixth Day of July, 1993

Attest:

MICHAEL K. KIRK

Attesting Officer

Acting Commissioner of Patents and Trademarks